United States Patent Office 3,150,917
Patented Sept. 29, 1964

3,150,917
TREATMENT OF POLYOLEFIN ARTICLES AND
RESULTING PRODUCTS
Domenick Donald Gagliardi, 185 Howland St.,
East Greenwich, R.I.
No Drawing. Filed Apr. 23, 1962, Ser. No. 189,280
11 Claims. (Cl. 8—55)

This invention relates to the treatment of polyolefin articles and to the resulting products. More particularly, it concerns modification of preformed fibers, films and other shaped articles of solid polymers of olefins so that they will be receptive to cationic finishing agents and will have improved dye receptivity, reduced static electricity propensities and greater adhesion to coatings.

High molecular weight polymers of ethylene, propylene and other olefins have been developed which possess great strength and a wide range of desirable properties. Such olefin polymers have become of great commercial importance because of their low cost coupled with their many attractive physical and chemical properties. The low-cost, high-strength plastics are being molded, extruded or otherwise fabricated into thousands of different types of household and industrial articles. Actually, the development of these new plastics is responsible for the creation of many new industries for their fabrication and utilization.

Thin section articles such as fibers and films constitute a major use of the high molecular weight polyolefins. Fibers alone constitute a potential enormous outlet for the polyolefins which are expected to find ever increasing use in the production of carpets or other floor coverings, fabrics for wearing apparel, furniture and seat covering and every other use for textile fibers and fabrics which employ large quantities of filaments or yarns. Future possible use of films of the polyolefins for packaging and many other uses staggers the imagination.

The widespread use of polyolefins and contemplated further expansion thereof is due to certain inherent attractive properties of the polymers, including high-strength, resistance to attack by insects, mildew or molds, high resistance to corrosion and attack by cleaning agents, light or other chemical or physical agents. However, some of these inherent properties of the polyolefins also have disadvantages. Thus, the high degree of chemical inertness of the polymers is a disadvantage with respect to the coloring or coating of the polymers. Since the polymers are so inert to most chemical agents, filaments, films or other shaped articles made therefrom cannot be dyed, colored or coated satisfactorily using conventional dyeing and coating materials and techniques. Hence, a tremendous amount of research and development work has been devoted to attempts to surmount the coloring and coating problems associated with the high molecular weight polyolefins. To date, the difficulties of dyeing and coloring the polymers have materially restricted their use and will continue to restrict the commercial markets and fields of applications of the polyolefins until satisfactory methods of coloring and coating these materials are developed.

Another inherent disadvantage of solid polymers of olefins is their tendency to acquire static electrical charges. Such static propensities are particularly troublesome in the use of the polyolefins for films and fabrics. This disadvantage is particularly pronounced with carpeting made of olefin fibers since it results in the annoying "sparking" which occurs when one walks across a floor covering made from yarns of olefin fibers. The static problem can be mitigated to some extent by applying various antistatic agents to the fibers or fabrics made thereof, but such treatments are not durable to many cleaning operations.

Prior investigations and developments designed to eliminate the non-adherent surface qualities of polyolefins have included treatments to chemically change the polymer molecules. For example, U.S. 2,937,066 concerns the sulfonation of polyethylene with concentrated sulfuric acid, oleum or the like. Also, U.S. 2,668,134 and 2,886,471 disclose the treatment of polyethylene with strong oxidizing agents to modify surface characteristics. However, it has been found by the users and fabricators of polyolefins that such drastic treatments result in discoloration, pitting, reduction in strength, shrinking, and mottled appearance. The defects are particularly apparent and render the procedures unsatisfactory in the processing of thin preformed sections of olefin polymers such as fibers and films.

A principal object of this invention is the provision of new processes for treatment of preformed articles of solid olefin polymers in order to improve surface properties thereof. Further objects include:

(1) The provision of new processes for improving the receptivity of fibers, yarns, fabrics, films and other shaped solid articles of solid olefin polymers to cationic finishing agents.

(2) The provision of new processes for reducing the static electricity propensities of preformed articles of solid polyolefins.

(3) The provision of new processes for modifying the surfaces of performed articles of solid polyolefins so as to obtain greater adhesion between such surfaces and coatings that are supplied to the surfaces.

(4) The provision of new processes for rendering fibers, films or other preformed articles of solid polymers of olefins which are normally substantially incapable of being satisfactorily dyed, capable of being dyed in level, deep shades with conventional cationic dyes using conventional dyeing methods.

(5) The provision of new methods for improving the surface receptivity of preformed articles of solid polyolefins that may be carried out in equipment conventionally available and which can be used in conjunction with conventional, commercially available cationic dyestuffs or other cationic finishing agents.

(6) The provision of new, improved forms of preformed articles of solid polyolefins possessing improved receptivity to cationic dyes and finishing agents.

(7) The provision of new and improved fibers, yarns, fabrics, films and other shaped solid articles of solid polymers of olefins having improved dye receptivity, reduced static electricity propensities and greater adhesion to resinous or other coatings applied to the surfaces of the preformed articles.

(8) The provision of new methods for increasing the ability of polyolefins to retain water-repellent agents, pigments and other coating or finishing materials which may be applied to the surfaces of the polyolefin articles.

Other objects and further scope of applicability of the present invention will become apparent from the detailed description given hereinafter; it should be understood, however, that the detailed description and specific examples, while indicating preferred embodiments of the invention, are given by way of illustration only since various changes and modifications within the spirit and scope of the invention will become apparent to those skilled in the art from this detailed description.

These objects are accomplished according to the present invention by the treatment of preformed articles of solid olefin polymers with dilute aqueous solutions of sulfuric acid and a polyoxy leveling agent, followed by drying and heating. A preferred procedure of operating is to apply to the preformed section of solid olefin polymer an aqueous solution containing about 0.1 to 5% sulfuric acid and about 0.1 to 5% of a polyalkylene oxide material having the formula:

$$R-(OR')_n-OR'' \qquad (I)$$

wherein R and R" are hydrogen, alkyl, aryl and/or acyl radicals, R' is an alkylene radical of 2 to 6 carbon atoms, and n is an integer from 2 to about 1,000, with R, R' and n being chosen to provide a substance (I) having a solubility of at least 1 part in 1000 parts of water at about 20° C. Typically R is hydrogen, and R" is hydrogen or a 2 to 18 carbon atom alkyl, aryl or acyl radical.

After the solution is applied, the article surface is heated to an elevated temperature to dry it and produce a change in the surface characteristics of the olefin polymer. Preferred temperatures of heating are from about 10° C. below the melting point of the olefin polymer down to about 100° C.

The article surface is rendered receptive to cationic agents by this treatment. Such agents can then be cohesively united to the article. For example, cationic dyes may be applied and the article will be dyed in level, deep shades even though it would not dye with the coloring agent before the treatment. Also, the treated article becomes receptive to other cationic finishing agents including the following:

(1) Quaternary ammonium antistatic agents
(2) Quaternary phosphonium textile softeners
(3) Polyamine antistatic agents
(4) Polyamine dyefixing agents
(5) Cationic amine-aldehyde thermosetting resins
(6) Dyestuffs (cationic)
(7) Cationic pigments
(8) Cationic water repellents
(9) Cationic germicidal agents
(10) Cationic adhesive resins
(11) Cationic imine phosphorous compounds
(12) Cationic fluorocarbon latices
(13) Cationic acrylic latices
(14) Cationic Werner complexes
(15) Cationic polyvalent metal salts The cationic agent may be applied at any suitable stage, but it has been found that improved results are obtained if the article is scoured or otherwise treated to remove excess sulfuric acid treating solution before applying the cationic agent.

The application of the acid treating solution can be by impregnation, spraying, coating, contact with liquid bath or any other suitable fashion. The contacting of the treated article with the cationic agent may be accomplished while the cationic agent is in the vapor or liquid form including solutions in organic solvents, aqueous dispersions or emulsions, as a component of molten bath, or from solubilizing systems using salts or other compounds which yield the cationic agents under the conditions of treatment.

According to a preferred embodiment, a two-step procedure for coloring preformed articles of olefin polymers involves first treatment of the article with the dilute sulfuric acid solution followed by dyeing or other coloring or coating of the surface of the article. In the case of textile materials, the modified, treated fabric may be colored by padding through a bath of basic dyestuff followed by drying of the colored material. Alternatively, the modified textile material may be printed with dye-printing systems utilizing conventional techniques.

The new article treatments as outlined above may be modified with preliminary, simultaneous or subsequent auxiliary processes and agents including wetting agents, leveling agents, thickening agents, anti-crocking agents, emulsifiers, water-repellents, oil-repellents and the like.

The success of the present invention is due in part to the discovery that the treating agent used for modification of the surface of the preformed polyolefin article produces a substantial improvement in the surface characteristics of the article that is permanent. In other words, the change in the article surface creating improved dye receptivity, reduction in static electricity propensities, etc., is not removed by washing, scouring, dry-cleaning, or other normal handling or processing operations to which fibers, films or other preformed articles of polyolefins would be subjected. On the other hand, these treatment procedures do not visibly affect the preformed articles nor detract from the strength or other desirable properties of the articles. Whether partial or complete penetration of the treating reagent into the fibers, films or other articles takes place is presently not known. In any event, the results of the treating procedures contrasts greatly with known behavior of surface coating where the color or other effect obtained by the coating is easily removed by rubbing, by wear or by washing and dry-cleaning processes. Sulfonation of the surface is not involved as infra-red analysis of treated and untreated polypropylene film showed no differences, and no new absorption bands were found in the region where —SO₃H should be present. It appears that the improved receptivity of the surface results from a change in the surface charge of the polyolefin.

The following list is exemplary of polyalkylene oxide materials which may be used in treating polyolefin articles in accordance with the invention. Mixtures of two or more such materials may be used in the procedures or a plurality of such reagents may be applied in separate treating steps.

Polyethylene oxide (mol. wt. 1000)
Diethylene glycol
Diethylene glycol monostearate
Diethylene glycol monobutyl ether
Diethylene glycol monoethyl ether
Polyethylene glycol monolaurate
Diethylene glycol monobutyl ether acetate
Dibutylene glycol
Hexamethylene glycol dihydroxy hexyl ether
Pentamethylene glycol dihydroxyethyl ether
Poly 2,3-hexanediol
Ethyl benzyl polyethylene glycol ether
Octyl phenoxy polyethoxy ethanol
Octyl phenoxy diethoxy ethanol
Hexyl phenyl polyethylene glycol ether
Amyl tolyl dibutoxy butanol
Polyoxyethylated nonyl phenol
Polyoxyethylene esters of mixed fatty and resin acids
Glyceryl mono-oleate
Polyoxy ethylene ether of mixed fatty alcohols A further understanding of the new procedures and resulting products of this invention may be had by reference to the following specific examples of actual operations in accordance with the invention. In these examples and throughout the remainder of the specification and claims, all parts or percentages are by weight unless otherwise specified.

*Example 1*

Separate samples of plain-weave fabric woven of spun yarn of polypropylene fibers were treated by padding through one of the following aqueous solutions:

(a) 0% sulfuric acid+0.5% polyethylene oxide
(b) 1% sulfuric acid+0.5% polyethylene oxide
(c) 2% sulfuric acid+0.5% polyethylene oxide
(d) 3% sulfuric acid+0.5% polyethylene oxide After padding at 50% wet pick-up, the four samples were dried for 15 minutes at 95° C. and 10 minutes at 120° C. They were scoured with 0.1% of a non-ionic detergent and 0.25% sodium carbonate, rinsed in water and dried. The samples were then treated with the cationic softening agent, distearyl dimethyl ammonium chloride, as a 1% solution in water, followed by drying.

One-half of each sample was washed at 60° C. with soap in a home washing machine. After washing only samples b, c and d retained a soft, smooth hand and showed antistatic properties when rubbed with a glass rod.

Example 2

The four samples of polypropylene fabric treated as in Example 1 and a sample of the untreated polypropylene fiber fabric were subjected to a dye-bath containing the cationic dye, Victoria Green. The samples were placed in a dye solution containing 1% dye on the weight of the fabric and a 30:1 bath to fabric ratio. Dyeing was performed with agitation at 95° C. for one hour, followed by scouring with a 0.1% non-ionic detergent and 0.25% sodium carbonate at 60° C., rinsed and dried. Examination of the five samples showed that those samples pretreated with the dilute sulfuric acid were deeply colored by the cationic dye, while the untreated and the polyethylene oxide treated control had only a very faint green tint.

Example 3

A sample of fabric woven of polypropylene monofilaments was treated with a dilute aqueous solution containing 1% sulfuric acid and 0.5% of an alkylphenol ethylene oxide condensate. After padding at 50% wet pick-up, the sample was dried 15 minutes at 120° C. and was then treated with the cationic agent, tris-aziridinyl phosphine oxide, from a 5% aqueous solution, followed by drying 15 minutes at 120° C. An untreated piece of the polypropylene fiber fabric was also treated with the cationic agent solution and dried. Both samples were scoured with 0.1% non-ionic detergent and 0.25% sodium carbonate at 60° C., rinsed and dried. To test for retention of the cationic finishing agent, both samples were dyed with a wool dye, a direct dye and a fiber reactive dye, namely, 3% on the original weight of the fabric of Wooncolan Black WA, Superlitefast Red 3BL and Procion Brilliant Blue. After dyeing at 95° C., the samples were scoured as in Example 2 and dried. All three fabrics which had been treated with the sulfuric acid solution and the cationic agent were deeply colored. Only a faint tint of color was found on the polypropylene fabric which had been treated only with the cationic agent without the sulfuric acid pretreatment.

Example 4

Two samples of polyethylene films were treated with an aqueous solution containing 0.5% sulfuric acid and 0.5% polyethylene oxide by brushing. After drying for 30 minutes at 105° C., the treated films were coated with a 50% solution of a cationic urea-formaldehyde resin adhesive. The two films, in sandwich form, were passed through squeeze rollers and cured for 10 minutes at 105° C. Another sandwich laminate was prepared from polyethylene films which had not been pretreated with the dilute sulfuric acid. The two sets of laminates, after curing, were placed in water overnight. The laminate made with the cationic resin without the dilute sulfuric acid pretreatment had separated in the water test. The dilute sulfuric acid treated polyethylene films laminated with the cationic resin were not separated.

Example 5

A sample of polyethylene monofilament fabric was treated with dilute aqueous solutions of 3% sulfuric acid and 1% of polyethylene oxide leveling agent followed by drying at 115° C. for 10 minutes. This sample and one of the untreated polyethylene fabric were padded through an aqueous solution containing 1.5% of the cationic Werner complex of perfluoro-octanoic acid, followed by drying 10 minutes at 115° C. Both samples initially showed water and oil repellency ratings of 100%. After one dry cleaning in perchlorethylene, however, only the sulfuric acid treated polyethylene was still water and oil repellent. The unmodified polyethylene fabric showed no water and oil repellency ratings.

Example 6

Samples of polypropylene fabrics were treated with aqueous solutions containing 3% sulfamic acid and 1% of the polyethylene oxide adduct of lauric acid. The samples were cured at 120° C. for 15 minutes during which time sulfuric acid was liberated. After scouring off unreacted materials, separate samples were colored with one of three cationic dyes, Victoria Green, Hidaco Violet and Caribbean Blue as in Example 2. Pieces of unmodified polypropylene were dyed in the same dye baths. Only those samples which had been treated with sulfamic acid were deeply colored by the cationic dyes.

The invention is applicable to treatment of any articles made of solid polymers of olefins which, in the absence of the treatment, would not be receptive to dyestuffs, would have a propensity to acquire static electrical charges or would exhibit a lack of adhesion to cationic finishing agents or coatings which might be applied to the surface of the articles. Those polymers which are of particular importance with respect to the new treatments are the class of solid polymers that have an inherent viscosity of at least 0.8 and particularly those having an inherent viscosity between about 1.2 and about 10. The term "inherent viscosity" as used herein, means the viscosity of a solution of 0.2 gram of the polymer in 50 cc. of tetralin at 130° C. The invention finds special applicability to the treatment of solid polymers of olefins of 2 to 4 carbon atoms.

The various types of olefin polymers which may be treated in accordance with the invention are extensively described in the patent and technical literature, e.g., see "Encyclopedia of Chemical Technology," first supplement volume (1957), pp. 699–712, and second supplement volume (1960), pp. 661–672.

The new surface treatment procedures are applicable both to homopolymers of olefins and interpolymers of olefins with unsaturated hydrocarbons or other polymerizable materials resulting in solid polymers that are incapable of being satisfactorily dyed or coated because of the general inertness of the polymer. Obviously, the new procedures are of particular importance in the treatment of fiber-forming polymers such as fiber-forming polyethylene, polypropylene or other homopolymers or copolymers of 2 to 4 carbon atoms α-olefins. The Textile Fiber Products Identification Act (Public Law 85–897), defines olefin fibers as "any manufactured fiber in which the fiber-forming substance is a long chain synthetic polymer composed of at least 85% by weight of ethylene, propylene or other olefin units." The new treatments of this invention are contemplated for use in connection with all olefin fibers as so defined.

Various proportions of the sulfuric acid treating solution relative to the polyolefin may be employed. For example, in a padding method of applying the treating material from a solution, satisfactory results may be obtained by the application of about 25% to 200% by weight of treating solution based upon the weight of the polyolefin. Deposition of between about 50 and 100% by weight of the treating solution has been found to be particularly useful. Where the operation is used in conjunction with the dyeing of the fiber or other article and lighter shades are desired, lower concentrations of the treating solution are most economical to use. In general, the amount of treating solution deposited is determined by the depth of shade of dyeing required or the degree of other change in surface characteristic required. The concentration of the reagents in the treating solution will likewise depend upon the degree of modification desired and also the proportion of solution to be applied relative to the treated article solutions of the treating reagent. Typically, concentrations of 1 to 5% produce satisfactory modification without any detriment to the strength or other desirable properties of the olefin polymer.

The treating solutions or other systems may include auxiliary agents such as heavy metal salts of organic acids, e.g., zinc, copper, nickel, cobalt and chromium salts of formic, acidic or other lower monocarboxylic acids. Also, they may include reagents to improve wash fastness, light fastness or other aspects of the final products. Such auxiliary agents would, for example, include synthetic resins, e.g., acrylic resins, amino-aldehyde resins, vinyl resins as well as wetting agents, leveling agents, emulsifiers, anti-oxidants, light-preserving agents or the like.

In order to have a permanent effect of the treating solution upon the polyolefin fibers or other articles, one should employ what may be referred to as a heating or aging step. This may be accomplished by heating the article in contact with the treating reagent to elevated temperatures, e.g., 100° to 250° C. for a period of about 1 to 120 minutes, preferably, 1 to 15 minutes, depending to some extent upon the degree of modification desired and other considerations. The higher the temperature, normally the less time is required for the predetermined degree of modification to be attained. Temperatures within the range of about 50° C. up to about 10° C. below the melting point of the polymer are useable. This aging phase of the treating methods may be effected by other ways than direct heating, e.g., flash diffusion of the treating agent under pressure or in the presence of superheated steam.

After the treatment of the polyolefin article with the treating solution, it is normally desirable to remove any solution residue. Such surplus removal, particularly in the case of fibers and textiles, is typically carried out by scouring the material to remove the loosely held treating reagent. For this purpose, conventional textile scouring techniques, dry-cleaning techniques or the like may be employed. Such cleaning procedures are generally followed by rinsing or drying, but the treatment procedure may be immediately followed by dyeing or printing steps without cleaning the surplus treating agent from the article surface. This is particularly true where the surplus would have no detrimental effect upon dyeing, coloring, printing or subsequent coating compositions. Acid neutralizing agents may, of course, be used to advantage in such residue removal operations.

The dyeing of treated polyolefin fibers, fabrics, films or the like following the surface modification thereof may be carried out with cationic, amidic or comparable basic dyes in conventional manners common to the art of dyeing textiles in machines such as the jig, beck, pad-steam range and pressure dyeing equipment. The conventional dyeing assistants, such as level agents, wetting agents, alkali salts, dye fixing agents, copper salts, chromium salts, etc., may be used in the process to produce uniform dyeing or to improve light fastness, wash fastness or the like as desired. Typical basic dyes that may be used are the following:

| | |
|---|---|
| Victoria Green WB | C.I. No. 42000 |
| Basic Green | C.I. No. 42040 |
| Basic Red | C.I. No. 42500 |
| Basic Blue | C.I. No. 51180 |
| Calcozine Red | C.I. No. 50240 |

Dye baths typically will contain about 1–2% of the dye based on the weight of the fabric and dyeing may be conducted with a bath/fabric ratio of about 10:1 to 100:1. Other conventional conditions used in dye operations may be employed.

The treatment of the polyolefin materials may be carried out at any suitable stage. For example, in the case of continuous filaments, the treatment with the dilute sulfuric acid may be accomplished immediately after spinning. In the case of yarns made of spun staple fibers, the treatment can be effected before the yarns are formed by operation upon the staple fiber or after formation of the yarn. Alternatively, fabrics can be woven from untreated monofilaments or spun yarn, after which they can be subjected to the new treatments and then dyed, colored, coated or subjected to other operations. This gives great flexibility to manufacturers and users of polyolefin fibers, films or other articles. For example, it enables the manufacturers of filaments and films to produce one commodity, rather than a whole series of modified materials, since, using the procedures of this invention, treatment of the polyolefin articles to make them receptive to dyeing or other coating operations can be conducted at the plant of the fabric manufacturer. Also, the new operations enable the textile processor or manufacturer to utilize the advantages of the new operations without making large investments in special processing equipment or in special training of personnel.

The treatment operations of the invention may be used for modification of olefin fibers when they constitute a portion of blended fabrics, e.g., when the fabrics are woven in admixture with polyester fibers, nylon fibers, silk fibers, cotton fibers or the like. On the other hand, it may be preferable to treat the olefin fibers prior to the weaving, knitting or other fabrication of the blended fabric, particularly where blended fabrics having multiple dye substantitive properties are to be processed.

The new treatments as above described make possible the coloration of fibers, films, rods, sheets and other preformed articles of solid olefin polymers with conventional basic dyestuffs which normally do not adhere to or dye the polymer surfaces. Such surface modification of the olefin polymers also has utility in the use of printing inks, labeling and production of other decorative effects. In addition, the operations render the olefin polymer surfaces less electrostatic, more receptive to laminating adhesives, more receptive to pigments, paints and other coating compositions, more receptive to fluid-repellent agents and the like.

The importance of the new polyolefin treatments can be well realized in the commercial utilization of polypropylene and polyethylene fibers, yarns, films, and fabrics, for, while polyolefins are inert chemically to the conventional functional finishing agents or dyestuffs, by these new procedures, such materials may be dyed, finished or coated with cationic substances.

I claim:

1. A process of improving the dye receptivity of polypropylene fibers which comprises:
    (a) providing a solution containing about 3 parts of sulfuric acid and 0.5 part of polyethylene oxide dissolved in about 95 parts of water,
    (b) padding polypropylene fibers with said solution,
    (c) drying the padded fibers for about 15 minutes at about 90° C.,
    (d) heating the dried fibers at 120° C. for about five minutes, and
    (e) treating the resulting fibers with a 1% aqueous solution of distearyl dimethyl ammonium chloride.

2. A process for improving the surface characteristics of a preformed article composed of solid polyolefin which comprises:
    (a) applying to said article an aqueous composition containing a mixture of about 0.1 to 5% sulfuric acid and about 0.1 to 5% of a polyalkylene oxide material having the formula:

$$R-(OR')_n-OR \qquad (I)$$

wherein
    (1) R is a radical selected from the group consisting of hydrogen, alkyl, aryl and acyl,
    (2) R' is an alkylene radical of 2 to 6 carbon atoms, and
    (3) n is an integer between about 2 and 1,000,
    (b) heating the article with the applied acid mixture at an elevated temperature between about 10° C.

below the melting point of said polyolefin and 100° C., and
(c) treating the resulting article with a cationic finishing agent.

3. A process of improving the ability of the surface of a preformed article composed of solid polyolefin to adhere to coatings applied thereto which comprises:
(a) contacting said article with a dilute aqueous mixture of sulfuric acid and a polyalkylene oxide leveling agent,
(b) drying the article,
(c) heating the dried article having thereon a residue of sulfuric acid and polyalkylene oxide leveling agent at a temperature between about 100° C. and about 10° C. below the melting point of the polyolefin for about 5 to 120 minutes, and
(d) applying a cationic finishing agent to the so-treated article.

4. A process of improving the dye receptivity of olefin fibers which comprises:
(a) contacting the fibers with an aqueous solution containing about 0.1 to 5% sulfuric acid and 0.1 to 5% of a polyalkylene oxide material (I) as defined in claim 2,
(b) heating the fibers while in contact with said aqueous solution at a temperature between about 10° C. below the melting point of said olefin fibers and 100° C., to first dry the fibers and then heat the fibers in the presence of the residues of said aqueous composition and
(c) separating the resulting treated olefin fibers from the aqueous solution.

5. A process of treating a preformed polyolefin article which comprises:
(a) contacting said article with a dilute aqueous solution of sulfuric acid,
(b) contacting said article with a polyalkylene oxide leveling agent,
(c) heating the article while in contact with the sulfuric acid and the polyalkylene oxide leveling agent at a temperature between about 10° C. below the melting point of said polyolefin article and 100° C.,
(d) freeing the article from said acid solution and said agent, and
(e) treating the resulting article with a cationic finishing agent.

6. A shaped article of polyolefin having improved surface characteristics produced by the process of claim 5.

7. Olefin fibers possessing the ability of being dyed in level shades with cationic dyes produced by the process of claim 4.

8. A process of dyeing olefin fibers which comprises:
(a) contacting olefin fibers with an aqueous solution containing 0.1 to 5% sulfuric acid and a polyalkylene oxide material having the formula (I) of claim 2,
(b) heating the fibers while in contact with said sulfuric acid solution at an elevated temperature above 100° C., but below the melting point of the fibers,
(c) cleaning the fibers to remove therefrom excess sulfuric acid and polyalkylene oxide material, and then
(d) dyeing the fibers with a cationic dye.

9. A process of reducing the static electricity propensities of a film of solid olefin polymer which comprises:
(a) contacting a film of solid olefin polymer with an aqueous solution containing about 0.1 to 5% of an acidic reagent selected from the group consisting of sulfuric acid and substances that yield sulfuric acid at elevated temperatures and about 0.1 to 5% of a polyalkylene oxide material (I) as defined in claim 2,
(b) heating the film while in contact with said aqueous solution at a temperature above about 100° C. and below about 10° C. less than the melting point of said olefin polymer for a time sufficient for the surface charge of the film to change,
(c) removing said aqueous solution from the film, and then
(d) applying a cationic anti-static agent to the film.

10. A film composed of solid polymer of a two to four carbon atom-olefin having low propensity to accumulate static electrical changes by surface modification by the process of claim 9.

11. A process of modifying the surface of preformed articles of solid polyolefin material to render the articles more receptive to coloring and coating compositions which comprises:
(a) applying to the article an aqueous solution containing about 0.1 to 5% of an acidic reagent selected from the group consisting of sulfuric acid and substances that yield sulfuric acid at elevated temperatures and about 0.1 to 5% of a polyalkylene oxide material (I) as defined in claim 2,
(b) drying the article to leave thereon a residue of acidic reagent and said polyalkylene oxide,
(c) heating the dried article for between about 5 to 120 minutes at a temperature above about 100° C. and below about 10° C. less than the melting point of said polyolefin material, the higher the temperature, the shorter the time, and
(d) washing the article to free the article of treating material not bonded to the article surface by said heating step (c).

References Cited in the file of this patent

UNITED STATES PATENTS

| | | |
|---|---|---|
| 2,628,534 | Gibbons | Feb. 17, 1953 |
| 2,786,783 | Hahn et al. | Mar. 26, 1957 |
| 2,793,964 | Gilbert et al. | May 28, 1957 |
| 2,832,698 | Walles | Apr. 29, 1958 |
| 2,832,699 | Walles | Apr. 29, 1958 |
| 2,879,177 | Nelson et al. | Mar. 24, 1959 |
| 2,886,471 | Bruce et al. | May 12, 1959 |
| 2,932,550 | Walmsley | Apr. 12, 1960 |
| 2,937,066 | Walles | May 17, 1960 |
| 2,973,241 | Scott et al. | Feb. 28, 1961 |
| 3,112,981 | Fuortes et al. | Dec. 3, 1963 |

FOREIGN PATENTS

| | | |
|---|---|---|
| 904,998 | Great Britain | Sept. 5, 1962 |

OTHER REFERENCES

Derwent Belgian Patents Report, No. 83A/B Belgian Patent No. 603,385, January 19, 1962, page C 26.